United States Patent [19]

Kahaner et al.

[11] 4,235,270
[45] Nov. 25, 1980

[54] TIRE WITH SUPPORTING AND CUSHIONING WALLS

[75] Inventors: Joel M. Kahaner, Akron; Grover W. Rye, Cuyahoga Falls, both of Ohio

[73] Assignee: The Goodyear Tire & Rubber Company, Akron, Ohio

[21] Appl. No.: 920,666

[22] Filed: Jun. 30, 1978

[51] Int. Cl.$^3$ .............................................. B60B 9/00
[52] U.S. Cl. ..................................... 152/7; 152/326
[58] Field of Search ...................... 152/5, 6, 7, 13, 203, 152/323–329, 40, 47, 343, 3, 39, 353 R, 53, 56; 307/63 PW

[56] References Cited

U.S. PATENT DOCUMENTS

| | | | |
|---|---|---|---|
| 1,001,715 | 8/1911 | Wall | 152/273 |
| 1,072,260 | 9/1913 | Reed | 152/271 X |
| 1,560,156 | 11/1925 | Gair et al. | 152/53 |
| 2,525,196 | 10/1950 | Bacon | 152/323 |
| 2,620,844 | 12/1952 | Lord | 152/326 |
| 2,742,941 | 4/1956 | Johnson | 152/326 |
| 2,912,032 | 11/1959 | Alexander | 152/6 |
| 3,183,544 | 5/1965 | Bailey | 152/5 X |
| 3,822,732 | 7/1974 | Ferguson et al. | 152/326 X |

Primary Examiner—Robert B. Reeves
Assistant Examiner—Gene A. Church
Attorney, Agent, or Firm—Frederick K. Lacher; Frank Pincelli

[57] ABSTRACT

A tire having an annular body of resilient elastomeric material with an outer member at the outer periphery which may carry a tread and an inner member at the inner periphery for mounting on a wheel rim. The inner member is supported and cushioned by a plurality of circumferentially spaced-apart wall members extending from the inner member to the outer member. The annular body may have one or more supporting rings and the wall members of adjacent rings as well as the wall members of the same ring may be offset circumferentially of the tire. The wall members provide a lateral spring rate and a variable radial spring rate across the tread of the tire. The wall members, tread, inner member and outer member may be reinforced by cords extending at bias angles or generally circumferentially of the tire. Sidewalls between the inner and outer members may also be provided for low pressure inflation and exclusion of foreign matter from the spaces between the wall members.

26 Claims, 13 Drawing Figures

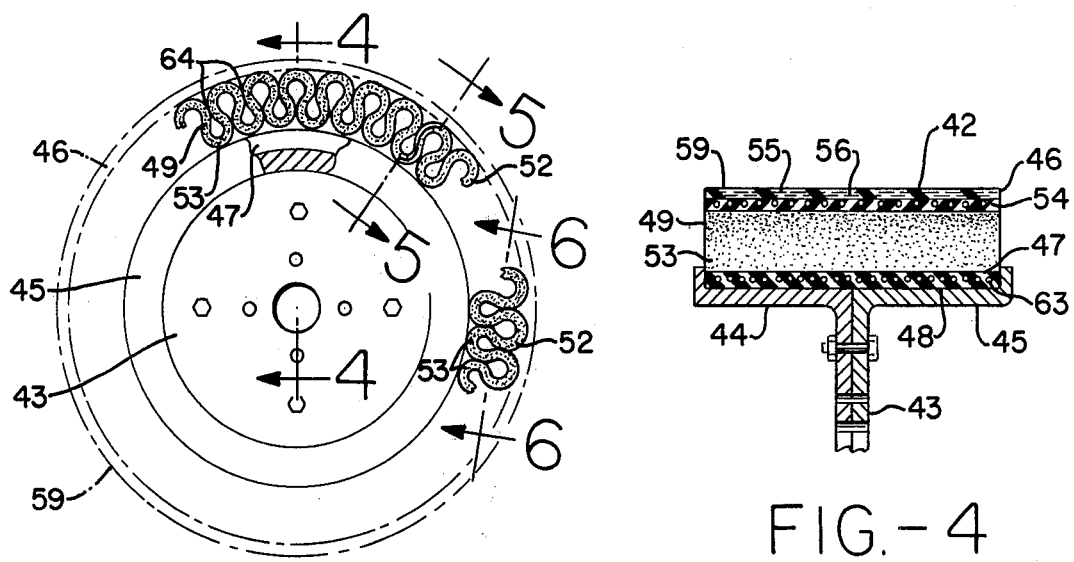
FIG.-3
FIG.-4
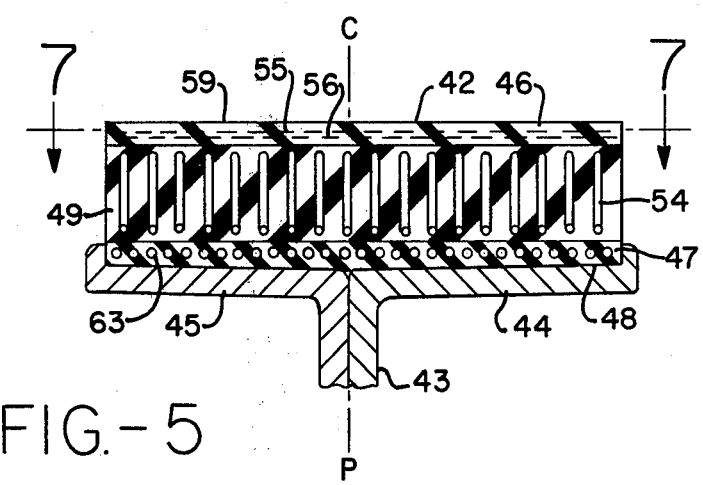
FIG.-5
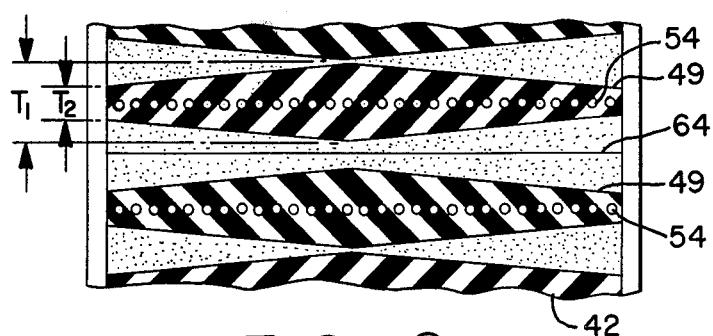
FIG.-6

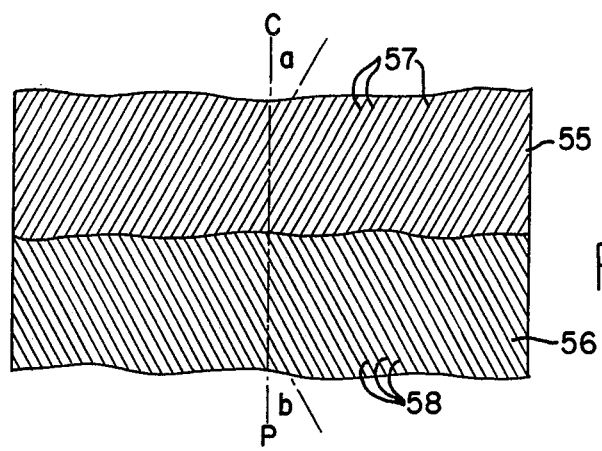
FIG.-7
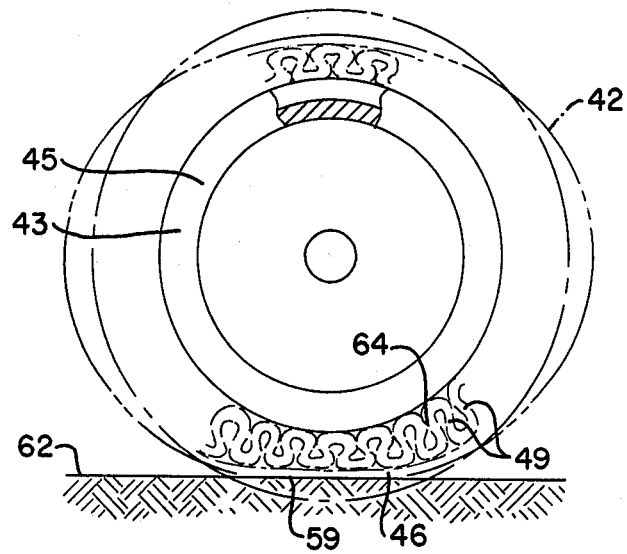
FIG.-8
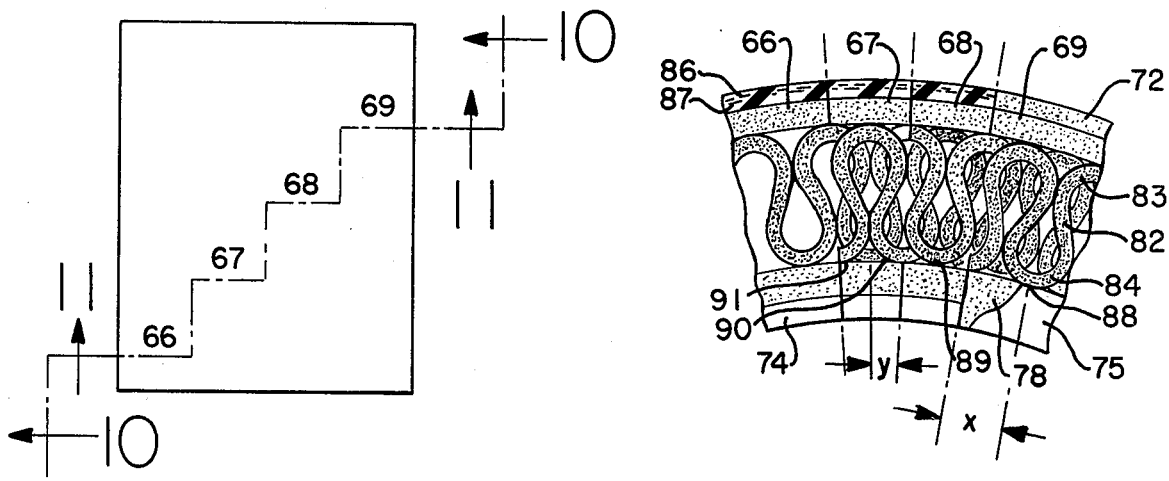
FIG.-9
FIG.-10

TIRE WITH SUPPORTING AND CUSHIONING WALLS

This invention relates to a novel and improved tire construction in which cushioning and support is provided by radially extending wall members.

A number of different types of tire constructions have been devised for use on vehicle wheels over the years with most vehicles having pneumatic tires to provide the desired cushioning. The difficulty with pneumatic tires is that they are subject to punctures and cannot be operated in the deflated condition for an appreciable distance. Cushioning devices have been placed inside pneumatic tires to support the tires in the deflated condition; however, the heat generated has limited the distance the tire can go in the deflated condition.

The nonpneumatic or solid tires used heretofore have not been completely satisfactory because they do not provide the necessary cushioning and handling characteristics. Various forms of openings have been provided in the tire bodies to reduce the weight and lower the operating temperatures. Although the removal of material from the body of a solid tire does decrease the weight, the strength of the tire is also decreased. Another disadvantage of the solid tire is the lateral rigidity preventing the tread portion from adjusting to a position which is not coaxial with the wheel axis and this has caused steering and wear problems. Solid tires also have not had the flexibility to adjust to the terrain while at the same time transfer torque and provide good steering characteristics.

Nonpneumatic tires have been proposed with an outer inextensible belt to avoid the change in circumference in the tread portion experienced with nonpneumatic solid tires and pneumatic bias cord ply tires; however, the tire constructions provided heretofore have not provided the strength and flexibility necessary for operation on a vehicle traveling around corners.

There has also been a problem with mounting the tire on a wheel rim so as to obtain the desired interaction between the outer member, the supporting and cushioning wall members, and the inner mounting surface of the tire.

In addition where radially extending supporting and cushioning members have been used, the radial spring rate across the tire has not been varied and it was not possible to obtain a higher tread pressure at the center of the tire than at the sides.

An object of this invention is to provide a tire supported by a unique load-carrying and cushioning intermediate wall structure for operation at high and low speeds.

Another object is to provide a load-carrying and cushioning wall structure with reinforced walls of elastomeric material.

A further object is to provide a reinforced inner member for mounting on a wheel rim and carrying the cushioning wall structure.

A still further object is to provide wall members extending axially of the tire to resist lateral stresses.

Another object is to provide wall members having a variable thickness transversely of the tire for a variable radial spring rate transversely of the tire.

A further object is to provide sidewalls to prevent dirt and other foreign matter from entering the spaces between the wall members.

A still further object is to provide an outer member having a ply construction for distribution of the load to the wall members.

Another object is to provide lateral flexibility of said tire.

To the accomplishment of the foregoing and related ends, the invention, then, comprises the features hereinafter fully described and particularly pointed out in the claims, the following description and the annexed drawings setting forth in detail certain illustrative embodiments of the invention, this being indicative, however, of but several of the various ways in which the principles of the invention may be employed.

In the annexed drawings:

FIG. 3 is an elevation of a modification of this invention showing the tire mounted on a wheel in the unloaded condition.

FIG. 4 is a fragmentary sectional view taken along the plane of line 4—4 in FIG. 3.

FIG. 5 is an enlarged fragmentary sectional view taken along the plane of line 5—5 in FIG. 3 with parts being broken away to show the reinforcing cords in the wall member.

FIG. 6 is an enlarged fragmentary sectional view of the wall members taken along the plane of line 6—6 in FIG. 3.

FIG. 7 is a fragmentary plan view of the tire member taken along the plane of line 7—7 in FIG. 5 with parts broken away to show the reinforcement cords thereof.

FIG. 8 is a schematic elevation like FIG. 3 showing the tire in the loaded operating condition in chain-dotted lines and with the unloaded shape of the tire being shown in dot-dash lines.

FIG. 9 is a schematic plan view of a tire embodying another modification of the invention in which the wall members are in multiple rows and offset one from the other.

FIG. 10 is an enlarged fragmentary sectional view of the tire of FIG. 9 taken along the planes of line 10—10 in FIG. 9.

Figure 1:
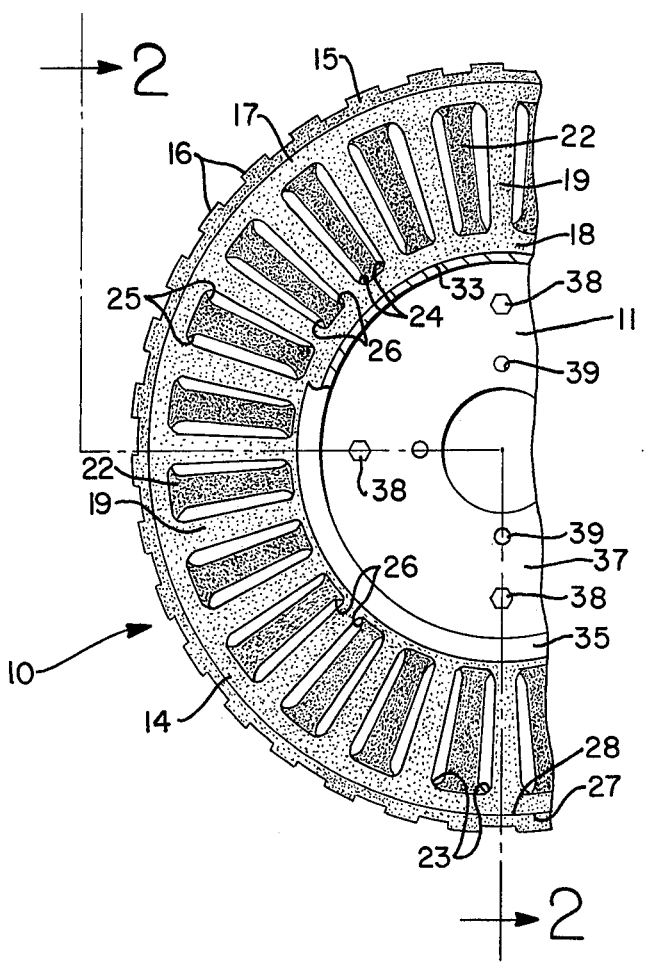
FIG. 1 is a schematic fragmentary elevation of a tire embodying this invention shown mounted on a wheel with parts being broken away.
Figure 2:
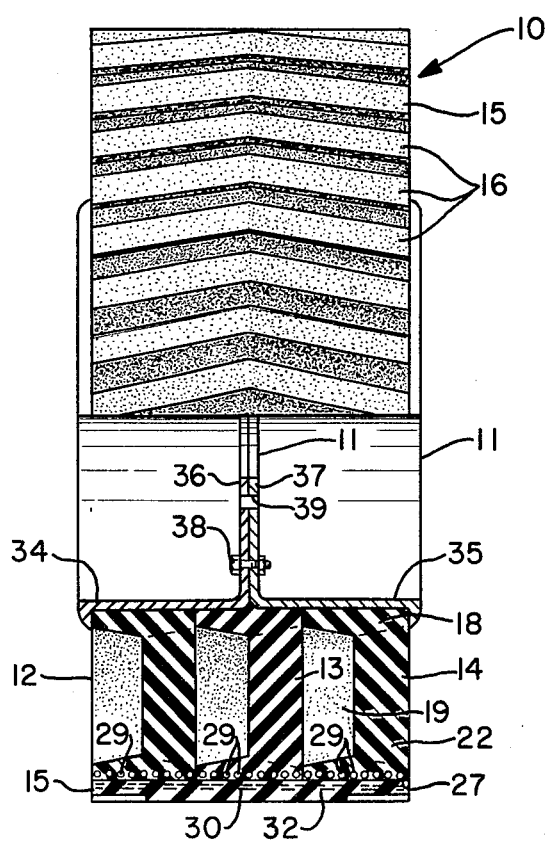
FIG. 2 is a side view partially in section taken along the plane of line 2—2 in FIG. 1.

Referring to FIGS. 1 and 2, a tire 10 is shown mounted on a wheel 11 of the split rim type. The tire 10 shown in the drawings is for a low speed vehicle such as a golf cart and includes an annular body of resilient elastomeric material with three supporting rings 12, 13 and 14 positioned in side-by-side relationship for mounting on the rim 11. An annular tread member 15 extends around the outer peripheral surfaces of the rings 12, 13 and 14 and may have suitable antiskid ribs 16 on the outer peripheral surface.

The rings 12, 13 and 14 have substantially the same structure and therefore the following description of ring 14 will apply to rings 12 and 13. The supporting ring 14 has a generally cylindrical outer member 17 at the outer periphery and a generally cylindrical inner member 18 spaced radially inward from the outer member. Between the outer member 17 and inner member 18 are two rows of connecting wall members 19 and 22. The wall members 19 extend axially of the tire and are circumferentially spaced apart around the ring 14 at one side of the ring. The wall members 22 are axially extending and circumferentially spaced apart at the other side of the ring 14. These two rows of wall members 19 and 22 are in axial juxtaposition with the wall members of one row being circumferentially offset from the wall members of the other row to distribute the load and avoid peaks in loading around the tire 10.

The wall members 19 and 22 provide the only supporting structural connection between the outer member 17 and inner member 18 and have a cross section sufficient to limit the maximum compressive loading of the wall members during operation so that the stresses developed in the members will not cause the members to undergo failure from flex fatigue. In the embodiment of FIGS. 1 and 2, the maximum compressive loading during operation is approximately 30 pounds per square inch for the elastomeric material of the wall members 19 and 22; however, the invention is not limited to this loading. The wall members 22 have curved portions 23 adjacent the outer member 17 and curved portions 24 adjacent the inner member 18. In a similar manner, the wall members 19 have curved portions 25 adjacent the outer member 17 and curved portions 26 adjacent the inner member 18. These curved portions 23, 24, 25 and 26 provide for increased support by the wall members at the outer and inner members 17 and 18. The outer member 17 has an outer peripheral surface 27 which is generally cylindrical for engagement with a generally cylindrical inner peripheral surface 28 of the tread member 15.

The outer member 17 and inner member 18 have a generally greater thickness at the axially inner portions than at the axially outer portions or edges as shown in FIG. 2. The outer member 17 may also be reinforced by a ply of cords 29 extending in a generally circumferential direction of the tire 10. In this embodiment, the cords are of a high modulus material such as steel helically wound around the ring 14 and embedded in the material of the outer member 17.

The tread member 15 may also be reinforced by two plies 30 and 32 of reinforcing cords extending at an angle to the circumferential direction of the tread member which may be from zero to 26 degrees. In the present embodiment, the plies 30 and 32 have cords at an angle of 26 degrees to the circumferential direction of the tire 10.

The inner member 18 has a radially inner rim-engaging surface 33 which is generally cylindrical and has a diameter slightly less than the diameter of split rim sections 34 and 35 for mounting the rings 12, 13 and 14 on the rim sections in tension. The rim sections 34 and 35 may also be tapered to facilitate mounting and stretching of the inner members 18 of the rings. Other mounting means are described on copending U.S. patent application Ser. No. 920,660 on Nonpneumatic Tire and Rim Assembly which was concurrently filed with this application. The split rim sections 34 and 35 have flanges 36 and 37, respectively, which may be bolted together by bolts and nuts 38 or bolted to a hub with bolts (not shown) extending through holes 39 in the flanges.

The tire 10 shown in FIGS. 1 and 2 has an aspect ratio of 55 percent with the radial height of the tire from the rim-engaging surface 33 of the inner member 18 to the ribs 16 of the tread member 15 being 2½ inches and the overall width of the tire being 4½ inches. Each of the rings 12, 13 and 14 has a width of around 1½ inches and outside diameter of around 9 inches and inside diameter of around 5½ inches. The height of the wall members 19 and 22 measured radially of the tire 10 is around 1½ inches and they are angularly spaced circumferentially at around 15 degrees from adjacent wall members of the same row. The thickness of each of the wall members 18 and 19 is around 3/10 inch at the middle of the rings and tapers to a lesser thickness at the edges.

In the manufacture of the tire 10, the rings 12, 13 and 14 may be molded individually. The tread member 15 may also be built and molded individually after which the rings 12, 13 and 14 may be positioned in axial juxtaposition and the tread member 15 extended around the rings and mounted on the outer peripheral surfaces 27. The tread member 15 may have a diameter at the inner peripheral surface 28 less than the diameter of the outer peripheral surface 27 of the rings 12, 13 and 14 to hold the tread member in place or a suitable adhesive may be applied to the peripheral surfaces 27 and 28 to adhere the tread member to the rings. After the tire 10 is assembled, it may be mounted on the split rim sections 34 and 35 by removing the bolts and nuts 38, separating the rim sections and sliding part of the rim-engaging surface 33 of the rings 12, 13 and 14 over one of the split rim sections and then inserting the other of the split rim sections 34 and 35 into engagement with the remaining rim-engaging surface of the rings. The bolts and nuts 38 are then inserted and clamped together.

The resilient elastomeric material used to make the tire 10 may be a moldable polymeric material such as natural rubber, styrene butadiene rubber, polybutadiene rubber or EPDM rubber or a blend of two or more of these rubbers. Preferably these materials can be utilized in either injection molding or compression molding.

It is also contemplated that ring 13 may be molded of a material having less flexibility than the material of rings 12 and 14 so that the tire may be deflected a greater amount at the edges than at the middle for better steering qualities. Also the tread member 15 and outer member 17 of the rings 12, 13 and 14 may be of a material having less flexibility than the material of the wall members 19 and 22 so that the footprint of the tire 10 will be larger and the load carried over a larger portion of the tread. The stiffness provided by the reinforcing plies 29 in the outer members 17 and the plies 30 and 32 in the tread member 15 also provides for increased distribution of the stresses over the tire. The width of the tire 10 contributes to the lateral spring rate for supporting the tire in curves. This is augmented by the axially extending wall members 19 and 22 which resist the lateral forces on the tire 10 during operation.

Referring to FIGS. 3 through 8, a modification of the invention is shown in which an annular body of resilient elastomeric material such as tire 42 is shown mounted on a wheel 43 of the split rim type having rim sections 44 and 45. The tire 42 has a generally cylindrical outer member 46 at the outer periphery and a generally cylindrical inner member 47 spaced radially inward from the outer member and having a generally cylindrical rim-engaging surface 48 with a diameter slightly less than the diameter of the split rim sections 44 and 45. Connecting wall members 49 extending axially of the tire 42 and having circumferentially spaced-apart portions are connected to the outer and inner members 46 and 47 as by vulcanization or by a suitable adhesive. The wall members 49 may be made from an elongated strap arranged in a sinuous configuration between the outer and inner members 46 and 47 with the strap looped at portions connected to the members. As shown in FIG. 3, the looped configuration provides curved portions 52 and 53 adjacent the outer member 46 and inner member 47, respectively. The wall members 49 may also have a greater thickness T1 at the center of the tire 42 than the thickness T2 at the edges as shown in FIG. 6 to provide a variable radial spring rate across the tire. The wall members 49 may also be reinforced by a ply 54 of cords of a reinforcing material generally used in tires such as nylon or aramid extending longitudinally of the elongated strap as shown in FIGS. 5 and 6.

The outer member 46 may be reinforced by plies 55 and 56 shown in FIGS. 3 and 7 having reinforcing cords 57 and 58, respectively, in overlapping relationship and extending at angles (a) and (b) to the curcumferential direction indicated by the centerplane CP of the tire. The angles (a) and (b) may be at any designated angle and preferably from zero to 26 degrees and in the present embodiment are 26 degrees. The cords 57 and 58 may also be of a reinforcing material generally used in tires such as nylon or aramid to form a belt and prevent any appreciable increase in the circumference of the outer member 46.

In this modification, the outer member 46 has an outer surface 59 for engaging the road surface 62 as shown in FIG. 8. This outer surface 59 of the outer member 46 may have a tread configuration if desired.

The inner member 47 is also reinforced by a ply 63 of reinforcing cords of a reinforcing material such as steel wire and these cords may extend in a generally circumferential direction with the cords of this embodiment being positioned at an angle of zero degrees to the centerplane CP of the tire 42. The cords 57 and 58 of the outer member plies 55 and 56, the cords of the wall member ply 54 and inner member ply 63 may be of the high modulus materials indicated of other materials of the class of nylon, rayon, polyester or wire.

In the embodiment shown, the outside diameter of the tire 42 at the outer surface 59 is 26½ inches and the diameter of the rim at the rim-engaging surface 48 is 22½ inches. The thickness T1 of the wall members is about 3/16 of an inch.

As shown in FIGS. 3, 6 and 8, adjacent wall members are in contact at positions 64 intermediate the outer member 46 and inner member 47. The wall member 49 may be adhered together at the positions 64 by a suitable adhesive or may be free to move relative to each other.

The tire 42 of this modification is adapted for passenger vehicles operating at normal highway speeds. With the load applied, the tire takes a configuration similar to that shown in FIG. 8 with the wall members 49 compressed adjacent the road-engaging surface 59. The maximum compressive loading during operation is limited by providing sufficient cross-sectional area of the wall members 49 as shown in FIG. 6 so that the stresses developed in the wall members will not cause the members to fail from flex fatigue. In this modification the maximum compressive loading during operation is limited to 30 pounds per square inch for the elastomeric material of the wall members 49; however, the invention is not limited to this amount.

The tire 42 of this modification may be built and vulcanized in different ways. One way of building the tire is to build the inner and outer members 47 and 46 separately on a drum or other suitable form. The wall members 49 can then be made from a strap built in one long piece and positioned in a sinuous configuration with a jig to hold the wall members in place with relation to the outer and inner members 46 and 47. This assembly can then be vulcanized. After the tire 42 is made, it can be mounted on the wheel by separating the rim sections 44 and 45, placing the rim-engaging surface 48 over one of the rim sections and then sliding the other rim section into engagement with the remaining rim-engaging surface. As shown in FIGS. 4 and 5, the rim sections 44 and 45 may be tapered to facilitate mounting of the tire 10 on the wheel.

Figure 11:
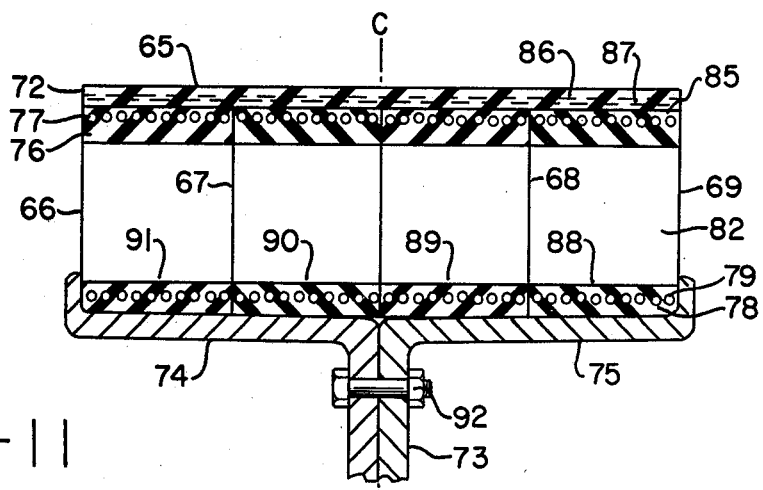
FIG. 11 is an enlarged fragmentary sectional view taken along the planes of line 11—11 of FIG. 9.

Referring to FIGS. 9, 10 and 11, a further modification is shown in which an annular body of resilient elastomeric material such as tire 65 including four supporting rings 66, 67, 68 and 69 and an annular tread member 72 are mounted on a wheel 73 of a split rim type with rim sections 74 and 75. Each of the rings 66 through 69 have the same construction and therefore the following description for ring 69 will apply to the other rings 66 through 68.

Ring 69 has a generally cylindrical outer member 76 at the outer periphery which may be reinforced by a ply 77 of cords of any suitable material such as, by way of example only, steel, fiberglass or aramid. These cords of ply 77 may be positioned at any desired angle and preferably at an angle of from zero to 26 degrees with respect to the circumferential direction or centerplane CP of the tire 65 and in this embodiment are at an angle of zero degrees.

An inner member 78 which is generally cylindrical is spaced radially inward from the outer member 76 and may be reinforced by a ply 79 of cords of any suitable reinforcing material such as, by way of example only, steel, fiberglass or aramid. In the present case the cords may be positioned at any desired angle and preferably between zero degrees and 26 degrees to the circumferential direction or with respect to the centerplane CP of the tire 65 and in this embodiment the cords of the the ply 79 are at an angle of zero degrees to the centerplane CP. Connecting wall members 82 are positioned in a sinuous configuration between the outer and inner members 76 and 78 with loops connected to the outer and inner members providing curved portions 83 and 84 adjacent the outer and inner members 76 and 78, respectively. The wall members may be reinforced by a ply of reinforcing cords (not shown) similar to those shown in the embodiment for FIGS. 3 through 8.

The tread member 72 extends around and is mounted on the outer peripheral surface 85 of the rings 66 through 69 and may be reinforced by a pair of overlapping plies 86 and 87 of reinforcing cords similar to the plies 55 and 56 described hereinabove for the embodiment of FIGS. 3 through 8. Each of the rings 66 through 69 may be manufactured in a similar manner to that described for the tire 42 of FIGS. 3 through 8.

In assembling the tire 65 of this embodiment, the rings 66 through 69 are circumferentially offset so that the attachment points 88, 89, 90 and 91 of the wall members to the inner members 78 are spaced at a distance Y less than the spacing between the attachment points of the wall members 88 to the inner member 78 which is indicated by the letter X. With this circumferentially offset spacing, the peaks of spring resistance are spread to provide a smooth rolling tire.

To assemble the tire 65, the tread member 72 is extended around the outer peripheral surfaces 85 of the rings 66 through 69 and mounted thereon by a suitable adhesive or vulcanization. The tire 65 is then mounted on the wheel 73 by separating the rim sections 74 and 75 and sliding the tire over one of the rim sections and then inserting the other rim section and bolting the rim sections together by suitable means such as bolts and nuts 92.

Figure 12:
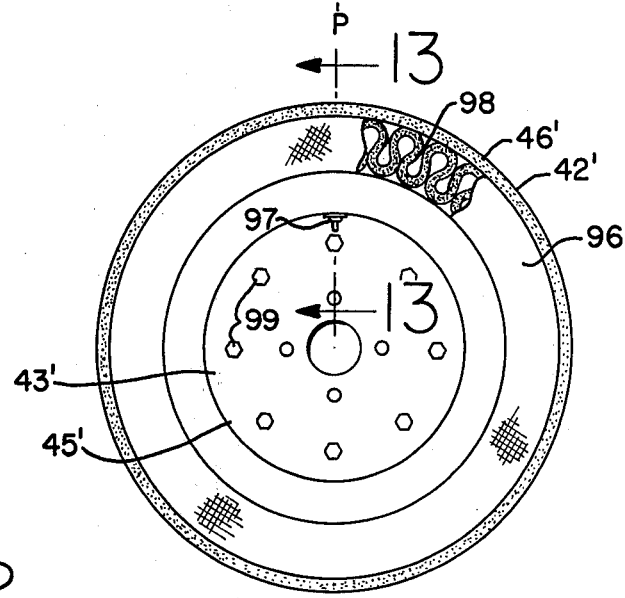
FIG. 12 is an elevation of a further modification of the invention with parts being broken away.
Figure 13:
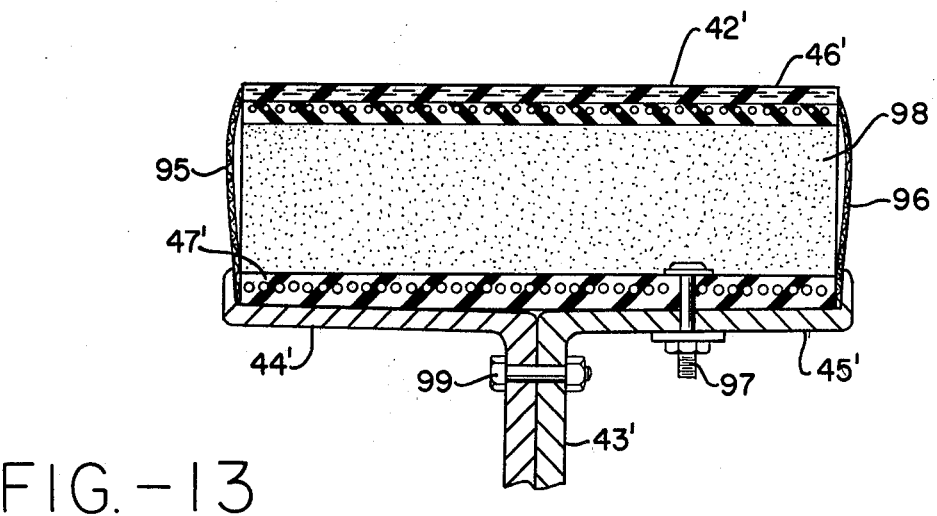
FIG. 13 is an enlarged fragmentary sectional view taken along the plane of line 13—13 of FIG. 12 showing the sidewalls.

Referring to FIGS. 12 and 13, a tire 42' like the tire of the embodiment of FIGS. 3 through 8 is shown mounted on a wheel 43' having rim sections 44' and 45' and outer member 46' and inner member 47'. In this embodiment, sidewall members 95 and 96 connect the outer and inner members 46' and 47' as by an adhesive. The sidewall members 95 and 96 may be of a reinforced film of urethane or other suitable material for excluding dirt and other foreign material from the space between the outer and inner members 46' and 47'. A valve means such as valve 97 may be mounted on the inner member 47' and extend through an opening in the split rim section 45' for inflating a cavity 98 enclosed by the sidewalls 95 and 96, the inner member 47' and outer member 46'. Fluid under pressure such as air at a pressure of approximately 5 pounds per square inch may be communicated to the cavity 98 through the valve 97 which will hold the sidewall members 95 and 96 in position and also provide some cushioning. In mounting the tire 42' on the wheel 43', the sidewall members 95 and 96 are attached prior to mounting on the rims and otherwise the same mounting procedure as described above for the embodiment of FIGS. 3 through 8 may be followed with the only exception being that the valve 97 would be inserted through the hole in the split rim section 45' when the tire is first mounted on the rim section 45' and then the rim section 44' would be inserted in the tire and the tire bolted together by bolts and nuts 99.

While certain representative embodiments and details have been shown for the purpose of illustrating the invention, it will be apparent to those skilled in the art that various changes and other modifications may be made therein without departing from the invention.

What is claimed is:

1. A tire rotatable about an axis comprising an annular body of resilient elastomeric material having a generally cylindrical outer member at the outer periphery, a generally cylindrical inner member spaced radially inward from said outer member and axially extending circumferentially spaced-apart connecting wall members between said outer member and said inner member, said wall members being the only structural connections between said inner and outer members, said wall members having a circumferential spacing and a cross section sufficient to limit the maximum compressive loading of said wall members during flexing so that the stresses developed in said members will not cause said members to undergo flex fatigue, each of said wall members having curved portions adjacent said inner and outer members for providing increased support to said wall members at said inner and outer members, said annular body having at least two supporting rings in side-by-side relationship, and an annular tread member extending around and being mounted on the outer peripheral surface of said outer member of each of said rings.

2. A tire according to claim 1 wherein each of said rings has at least two rows of said wall members in axial juxtaposition and the wall members of one row being circumferentially offset from the wall members of the other row.

3. A tire according to claim 2 wherein said wall members have a greater thickness at the axially inner portions than at the axially outer portions.

4. A tire according to claim 1 wherein at least some of said wall members include a strap looped at the portions of the wall members connected to said inner and outer members.

5. A tire according to claim 4 wherein said outer member is reinforced by generally circumferentially extending cords of reinforcing material.

6. A tire according to claim 4 wherein said tread member is reinforced by cords of reinforcing material.

7. A tire according to claim 4 wherein each of said wall members is reinforced by at least one ply of reinforcing cords embedded in the wall member providing a laminated structure with predetermined spring rates in the lateral and radial directions.

8. A tire rotatable about an axis comprising an annular body of resilient elastomeric material having a generally cylindrical outer member at the outer periphery, a generally cylindrical inner member spaced radially inward from said outer member and axially extending circumferentially spaced-apart connecting wall members extending radially between said outer member and said inner member, said wall members being the only structural connections between said inner and outer members and having a greater thickness in the circumferential direction at positions of said wall members adjacent said inner and outer members than the thickness of portions of said wall members spaced from said inner and outer members, said wall members having a circumferential spacing and a cross section sufficient to limit the maximum compressive loading of said wall members during flexing so that the stresses developed in said members will not cause said members to undergo flex fatigue and each of said wall members having curved portions adjacent said inner and outer members for providing increased support to said wall members at said inner and outer members.

9. A tire according to claim 8 wherein an annular tread member extends around and is mounted on the outer peripheral surface of said outer member.

10. A tire according to claim 8 wherein said outer member is reinforced by cords of reinforcing material.

11. A tire according to claim 9 wherein said tread member is reinforced by cords of reinforcing material.

12. A tire rotatable about an axis comprising an annular body of resilient elastomeric material having a generally cylindrical outer member at the outer periphery, a generally cylindrical inner member spaced radially inward from said outer member and axially extending circumferentially spaced-apart connecting wall members between said outer member and said inner member, said wall members being the only structural connections between said inner and outer members, said wall members having a circumferential spacing and a cross section sufficient to limit the maximum compressive loading of said wall members during flexing so that the stresses developed in said members will not cause said members to undergo flex fatigue, each of said wall members having curved portions adjacent said inner and outer members for providing increased support to said wall members at said inner and outer members, said annular member having three supporting rings in side-by-side relationship and an annular tread member extending around and mounted on the outer peripheral surface of said rings, said tread member and said outer member being reinforced by plies of cords of reinforcing material, said wall members extending radially between said inner and outer members and having a greater thickness at the axially inner portions than at the axially outer portions, each of said rings having two rows of said wall members in axial juxtaposition with the wall members of one row being circumferentially offset from the wall members of the other row and said wall members having a greater thickness in the circumferential direction at the portions of said wall members adjacent said inner and outer members than the thickness of portions of said wall members spaced from said inner and outer members.

13. A tire rotatable about an axis comprising an annular body of resilient elastomeric material having a generally cylindrical outer member at the outer periphery, a generally cylindrical inner member spaced radially inward from said outer member and axially extending circumferentially spaced-apart connecting wall members between said outer member and said inner member, said wall members being the only structural connections between said inner and outer members, said wall members having a circumferential spacing and a cross section sufficient to limit the maximum compressive loading of said wall members during flexing so that the stresses developed in said members will not cause said members to undergo flex fatigue, each of said wall members having curved portions adjacent said inner and outer members for providing increased support to said wall members at said inner and outer members, an annular tread member extending around and mounted on the outer peripheral surface of said outer member, and each of said wall members being reinforced by at least one ply of reinforcing cords embedded in the wall member providing a laminated structure with spring rates in the lateral and radial directions.

14. A tire according to claim 13 wherein said outer member has less flexibility than said wall members to provide for distribution of the load over said wall members.

15. A tire according to claim 13 wherein each of said wall members has a thickness at the edges which is less than the thickness spaced from the edges to provide a variable radial spring rate across the tire.

16. A tire according to claim 13 wherein said outer member is reinforced by a ply of cords of reinforcing material.

17. A tire according to claim 16 wherein said outer member is reinforced by a second ply in laminated relationship to said first-mentioned ply and said second ply and third ply have reinforcing cords positioned at a bias to the circumferential direction of said tire.

18. A tire according to claim 16 wherein the reinforcing cords of said second ply and said third ply are of a textile material.

19. A tire according to claim 16 wherein said inner member is reinforced by cords of reinforcing material.

20. A tire according to claim 13 wherein at least some of said wall members include a strap looped at the portions of the wall members connected to said inner and outer members.

21. A tire according to claim 20 wherein portions of said strap intermediate said connections to said inner and outer members are connected to provide increased lateral stability.

22. A tire according to claim 13 wherein said inner and outer members are connected by sidewall members.

23. A tire according to claim 22 wherein said sidewall members, said inner member and said outer member define an enclosed cavity within the tire for retaining a fluid under pressure and valve means to communicate said fluid into and out of said cavity.

24. A tire according to claim 3 wherein said wall members have a cross section sufficient to limit the maximum compressive loading of said wall members during flexing to 30 pounds per square inch.

25. A tire rotatable about an axis comprising an annular body of resilient elastomeric material having a generally cylindrical outer member at the outer periphery, a generally cylindrical inner member spaced radially inward from said outer member and axially extending circumferentially spaced-apart connecting wall members between said outer member and said inner member, said wall members being the only structural connections between said inner and outer members, said wall members having a circumferential spacing and a cross section sufficient to limit the maximum compressive loading of said wall members during flexing so that the stresses developed in said members will not cause said members to undergo flex fatigue, each of said wall members having curved portions adjacent said inner and outer members for providing increased support to said wall members at said inner and outer members, and at least some of said wall members including a strap looped at the portions of the wall members connected to said inner and outer members.

26. A tire according to claim 25 wherein portions of said strap intermediate said connections to said inner and outer members are connected to provide increased lateral stability.

* * * * *